UNITED STATES PATENT OFFICE.

JENS DEDICHEN, OF BERLIN-HALENSEE, AND WERNER LANGE, OF BERLIN-FRIE-DENAU, GERMANY, ASSIGNORS TO ACTIEN GESELLSCHAFT FÜR ANILIN FABRIKA-TION, OF BERLIN, GERMANY.

GREEN SUBSTANTIVE TRISAZO DYES.

1,183,831.  Specification of Letters Patent.  Patented May 16, 1916.

No Drawing.  Application filed June 5, 1915. Serial No. 32,413.

*To all whom it may concern:*

Be it known that we, JENS DEDICHEN and WERNER LANGE, the former a citizen of Norway and the latter a citizen of Germany, residing at Berlin-Halensee, Germany, and Berlin-Friedenau, Germany, our post-office addresses being Seesenerstrasse 25, Berlin-Halensee, Germany, and Feurigstrasse 10, Berlin-Friedenau, Germany, have invented certain new and useful Improvements in Green Substantive Trisazo Dyes, of which the following is a specification.

The present invention relates to new trisazo-dyes dyeing cotton green. These dyes correspond to the general formula:

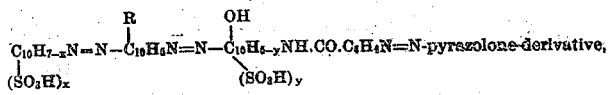

R meaning a univalent atom or radical, such as hydrogen, an alkoxy—or a sulfonic group. They may be manufactured by diazotizing the 4-amino-azo-compound prepared from a diazonaphthalene-sulfonic acid and an amino-compound of the naphthalene series and combining the diazocompound with a 1-aminobenzoylamino-8-naphthol-sulfonic acid, further diazotizing the disazo-compound and coupling at last with a pyrazolone-derivative, such as 1-phenyl-3-methyl-5-pyrazolone.

The new dyes are in the shape of their dry sodium salts blackish powders soluble in water with green color not being essentially altered by soda-lye. The addition of hydrochloric acid to the neutral solution causes a green precipitation. Concentrated sulfuric acid dissolves the dyes to a green solution from which the dyes are precipitated by addition of ice. The dyes, producing on cotton green shades, are destroyed by strong reducing agents, the solution becoming colorless. The products of reduction are a naphthylamin-sulfonic acid, a para-diamin of the naphthalene series, a 1-aminobenzoylamino-7-amino-8-naphthol-sulfonic acid and a 4-amino-1-aryl-5-pyrazolone, such as 4-amino-1-phenyl-3-methyl-5-pyrazolone.

The following example serves—the parts being by weight—to illustrate the invention without limiting it: 32.5 parts of 2-naphthylamin-4.8-disulfonic acid (monosodium salt) are diazotized with 7 parts of sodium nitrite in hydrochloric acid. The diazocompound is combined with 15 parts of 1-naphthylamin. Then 7.5 parts of sodium nitrite dissolved in water are added. The diazoazo-compound formed is salted out, filtered off, suspended in water, mixed with a cooled solution of 30.5 parts of 1-meta-aminobenzoylamino-8-naphthol-4-sulfonic acid alkaline by sodium carbonate. The combination being complete the blue disazo-dye is salted out in the heat, then dissolved in water and diazotized at ordinary temperature with 7 parts of sodium nitrite and hydrochloric acid. The diazo-disazo-compound in combined with 17.5 parts of 1-phenyl-3-methyl-5-pyrazolone in the presence of sodium carbonate. The dye is salted out, drained and dried. It probably corresponds to the formula:

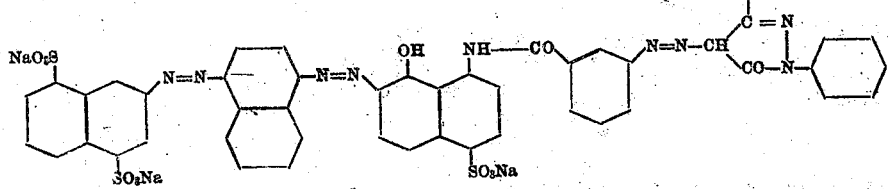

Instead of the 2-naphthylamin-4.8-sulfonic acid another naphthylaminemono- or -disulfonic acid may be used. In analogous manner for the other compounds their equivalents can be substituted, for instance 1-aminobenzoylamino-8-naphthol-4-sulfonic acid may be replaced by 1-meta- or 1-para-aminobenzoylamino-8-naphthol-3.6-disulfonic acid and the 1-naphthylamin by 1-amino-2-naphthol-ethyl ether or a sulfonic acid of one of these compounds.

We claim,—

1. The herein-described trisazo-dyes derived from a naphthylamin-sulfonic acid, an amino-compound of the naphthalene series, a 1 - aminobenzoylamino - 8 - naphthol - sulfonic acid and a pyrazolone-derivative and corresponding to the general formula:

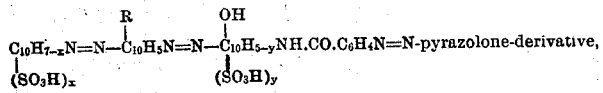

R meaning a univalent atom or radical, such as hydrogen, an alkoxy- or a sulfonic group: as sodium salts being blackish powders, soluble in water with green color, not essentially alterable by soda lye; from aqueous solution dyeing cotton green; the dye being precipitated in green flocks from the solution by addition of hydrochloric acid; being dissolved by concentrated sulfuric acid to a green solution, from which on addition of ice, the dye is precipitated; being destroyed by strong reducing agents yielding a naphthylamin sulfonic acid, a para-diamin of the naphthalene series, a 1 - aminobenzoylamino - 7 - amino - 8 - naphthol-sulfonic acid and a 4-amino-1-aryl-5-pyrazolone.

2. The herein-described trisazo-dyes derived from a naphthylamin-sulfonic acid, 1 - naphthylamin, a 1 - aminobenzoylamino-8 - naphthol - sulfonic acid and 1 - aryl - 3 - methyl-5-pyrazolone and corresponding to the general formula:

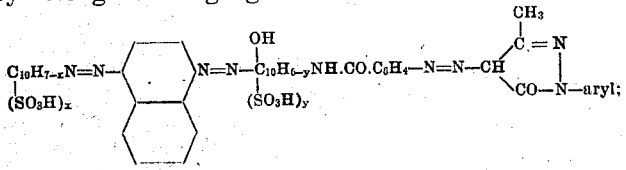

as sodium salts being blackish powders soluble in water with green color not essentially alterable by soda lye, from aqueous solutions dyeing cotton green; the dye being precipitated in green flocks from the solution by addition of hydrochloric acid; being dissolved by concentrated sulfuric acid to a green solution, from which on addition of ice the dye is precipitated; being destroyed by strong reducing agents yielding a naphthylamin sulfonic acid, 1.4-diaminonaphthalene, a 1-aminobenzoylamino-7-amino-8-naphtholsulfonic acid and 4-amino-1-aryl-3-methyl-5-pyrazolone.

3. The herein-described trisazo-dyes derived from 2-naphthylamin-4.8-disulfonic acid, 1-naphthylamin, a 1-amino-benzoyl-amino-8-naphtholsulfonic acid and 1-aryl-3-methyl-5-pyrazolone and corresponding to the formula:

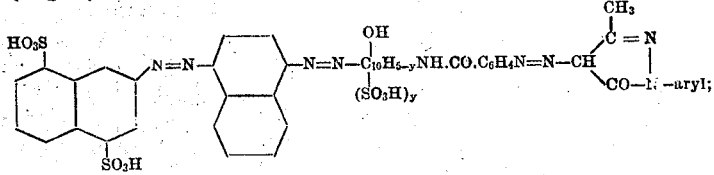

as sodium salts being blackish powders, soluble in water with green color not essentially alterable by soda-lye; dyeing cotton green; the dye being precipitated in green flocks from the solution by addition of hydrochloric acid; being dissolved by concentrated sulfuric acid to a green solution, from which on addition of ice the dye is precipitated; being destroyed by strong reducing agents yielding 2-naphthylamin-4.8-disulfonic acid, 1.4 - diamino - naphthalene, a 1 - amino - benzoylamino - 7 - amino - 8- naphthol-sulfonic acid and 4-amino-1-aryl-3-methyl-5-pyrazolone.

4. The herein-described trisazo-dyes derived from 2-naphthylamin-4.8-disulfonic acid, 1-naphthylamin, a 1-amino-benzoyl-amino - 8 - naphthol - sulfonic acid and 1-phenyl - 3 - methyl - 5 - pyrazolone and corresponding to the formula:

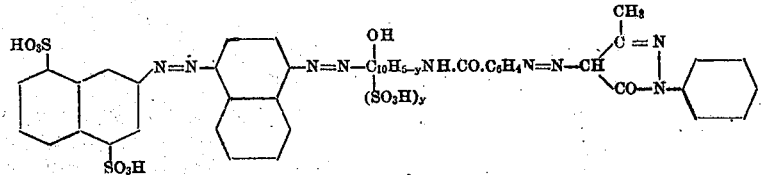

as sodium salts being blackish powders soluble in water with green color, not essentially alterable by soda lye; dyeing cotton green; the dye being precipitated in green flocks from the solution by the addition of hydrochloric acid, being dissolved by concentrated sulfuric acid to a green solution from which on addition of ice the dye is precipitated; being destroyed by strong reducing agents yielding 2-naphthylamin-4.8-disulfonic acid, 1.4-diaminonaphthalene, a 1-amino-benzoylamino-7-amino-8-naphthol-sulfonic acid and 4-amino-1-phenyl-3-methyl-5-pyrazolone.

5. The herein-described trisazo-dye derived from 2-naphthylamin-4.8-disulfonic acid, 1-naphthylamin, 1-meta-aminobenzoyl-amino-8-naphthol-4-sulfonic acid and 1-phenyl-3-methyl-5-pyrazolone and corresponding to the formula:

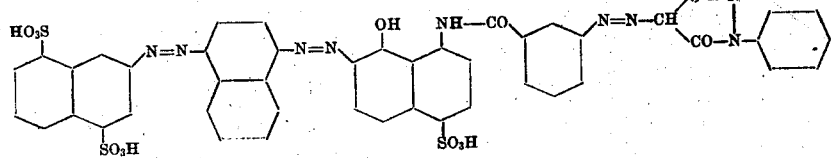

as sodium salt being a blackish power, soluble in water with green color not essentially alterable by soda-lye; dyeing cotton green; the dye being precipitated in green flocks from the solution by addition of hydrochloric acid; being dissolved by concentrated sulfuric acid to a green solution; from which on addition of ice the dye is precipitated; being destroyed by strong reducing agents yielding 2-naphthylamin-4.8-disulfonic acid, 1-4-diaminonaphthalene, 1-meta-aminobenzoylamino-7-amino-8-naphthol-4-sulfonic acid and 4-amino-1-phenyl-3-methyl-5-pyrazolone.

In testimony whereof we have hereunto set our hands in presence of two subscribing witnesses.

JENS DEDICHEN.
WERNER LANGE.

Witnesses:
HENRY HASPER,
WOLDEMAR HAUPT.